Oct. 30, 1934.  W. J. HOGG  1,978,427
COMBINED CIRCULAR CHASER AND TURNING TOOL
Filed May 4, 1932
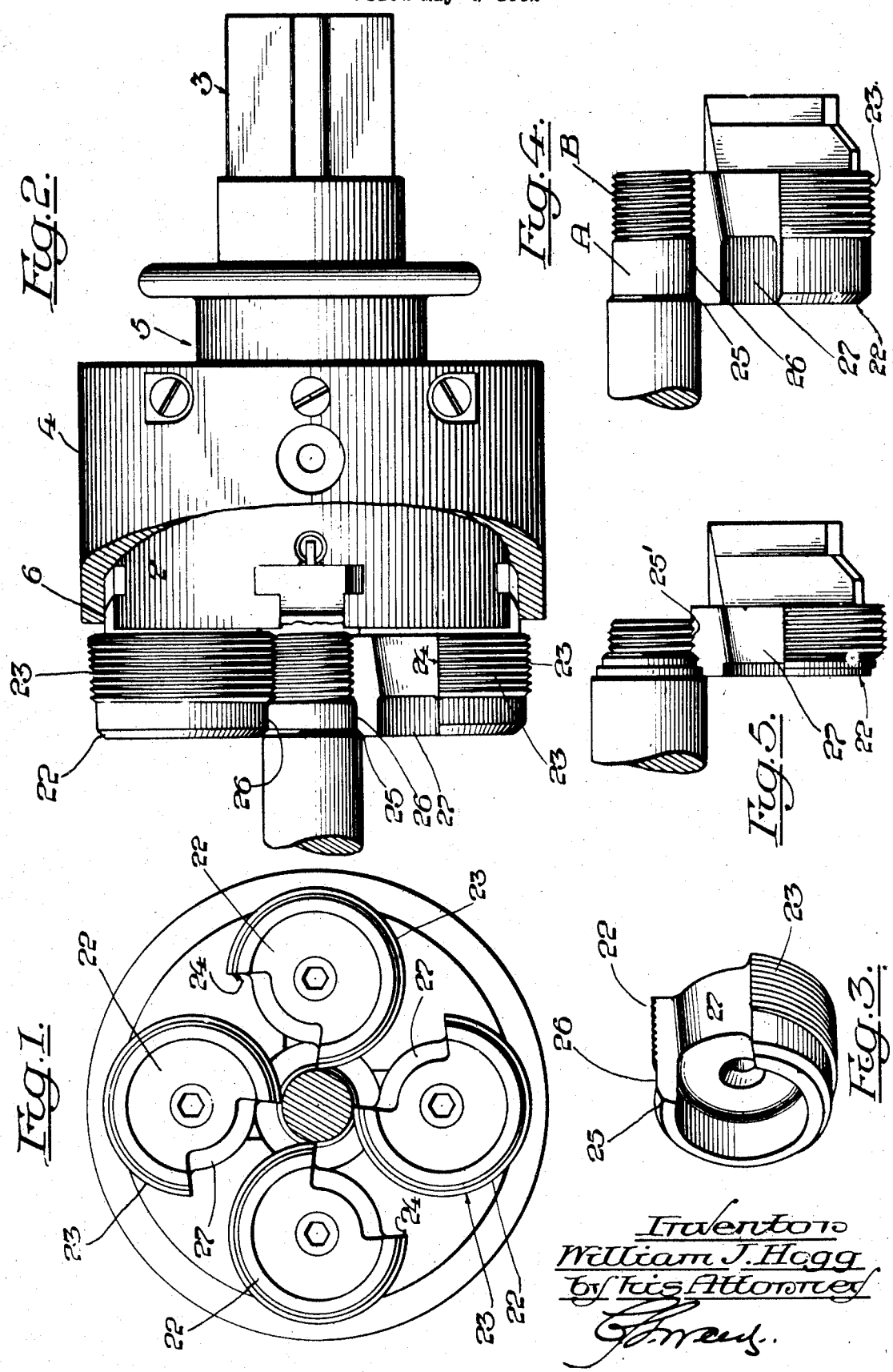

Patented Oct. 30, 1934

1,978,427

UNITED STATES PATENT OFFICE 1,978,427

COMBINED CIRCULAR CHASER AND TURNING TOOL

William J. Hogg, Cleveland, Ohio, assignor to The National Acme Company, Cleveland, Ohio, a corporation of Ohio Application May 4, 1932, Serial No. 609,113

24 Claims. (Cl. 10—103)

This invention relates to automatic threading dies, more particularly, however, to the cutters or chasers thereof, the object of the invention being to provide a circular cutter or chaser of improved form in which the cutter or chaser may be used for both cutting or turning the stock and for subsequently threading it.

The present invention is an improvement upon that shown and described in my contemporaneously pending application, Serial Number 459,700, filed June 7th, 1930, and assigned to the National Acme Company, the owner of the present improvement, and reference is made to that case for a detailed description of the construction of the die itself and the manner of supporting the chasers therein, the present improved chaser having, as set forth in that case, straight grooves instead of spiral formed grooves, the chasers, however, being so set that they have all the effects of the spiral grooves without any of their disadvantages.

In the drawing accompanying and forming a part of this specification, Fig. 1 is a front view of a die, illustrating four of the circular chasers in position.

Fig. 2 is a side view of the die partly broken away and illustrating a piece of work in position to be both turned and threaded.

Fig. 3 is a perspective view of one of the chasers.

Fig. 4 is a detail view illustrating one of the circular chasers and a piece of work being turned and threaded, and Fig. 5 illustrates a modification in which the chaser is so formed as to hollow mill a piece of work in one operation.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawing, since the invention is capable of other embodiments, and that the phraseology which I employ is for the purpose of description and not of limitation.

As the improvement has primarily to do with circular chasers, a brief description only is deemed necessary of the rest of the die, which in the main may be similar to threading dies heretofore patented by The National Acme Company and in the present instance comprises a slotted body 2 having a shank 3 for attachment to the tool spindle holder of the machine. Upon this shank body is located a shiftable cap or housing 4 having a grooved collar 5, by means of which the cap may be shifted in the usual way by the means provided for that purpose in the machine.

The cap and chaser carrying blocks are provided with suitable cam faces and the die is provided with adjusting screws for adjusting the chasers to the proper diameter of the work and the chasers are suitably positioned and guided in chaser receiving slots or recesses carried by the front face of the die body.

Each of the chasers or cutters 22 is substantially circular but with a segment or sector thereof removed and has substantially circular straight parallel grooves 23 cut therein instead of spiral threads, and these grooves terminate in a depthwise cutting edge 24. The circular chaser is turned and ground on a slight taper on the outside diameter to allow the proper clearance and guide for the chaser angle, the diameter at the front being less than that at the rear of the chaser, with the result that the front portion of the chaser does the cutting while the rear portion guides or pulls the chaser onto the work with the grooves acting as a guide except on chasers used for tapered threads where the full width of the chaser is engaged when cutting the thread. For some classes of work this taper may be reversed and in others the chaser may be ground on a straight line. The formation of the chasers and location thereof, insofar as they have to do with the threading of the work, is similar to that shown in said contemporaneously pending application and, therefore, a detailed description is not deemed necessary herein, and serrated bushings are used, as set forth in said case, for the mounting of the chasers on the chaser blocks.

Each chaser in the present improvement has its forward end shaped to provide a cutting or turning portion 25 which first engages the work or rod whereby the rod is shaped or turned as at A, Fig. 4, and subsequent to this, the rod is threaded as at B, Fig. 4, by the threaded portion of the chaser.

For this purpose, the chaser is provided with a forwardly extending plain portion or band forming a chambered portion 27 and each chaser has a segmental or sector portion thereof cut away and the forward extension of the chaser formed by this chambered portion 27 permits the formation of the cutting edge 25 and therebetween and the grooves 23, a shaving edge 26 so that the work can be cut or turned and then shaved and then threaded. Thus, the turning or cutting edge effects what is often-times referred to as a roughing cut and the edge 26 effects what is frequently termed a finishing cut and both these cutting portions are as hereinbefore stated carried by that part of the chaser located in front of the threading grooves.

In some instances, as shown in Fig. 5, the dies may have the thread grooves omitted and be simply shaped to perform the necessary cutting operations as illustrated in Fig. 5. In this figure the threading grooves are designated by the numeral 25'.

The cutting edge 25 can be ground to suit any angle or shape to be made and between this cutting edge and the threads is a straight portion or cutting edge 26 as before stated which acts to shave the work for greater accuracy and smoothness so that the stock or work may be cut, shaved and threaded by each chaser in one operation.

The tools are set on an inclined chaser block and this gives the face of the tool some clearance so that when grinding it is only necessary to grind the face of each tool and both the hollow mill section and the chaser section are ground ready to operate.

Thus, in the present improvement, I have provided a circular chaser for threading dies which will not only thread the work but also cut and shave it prior to such threading operation and all in one operation, thus materially reducing the cost of the product since heretofore it has been necessary to cut and shave the work on one part of the machine and then thread it on another part thereof, referring particularly to a multiple spindle screw machine whereas, in the present improvement, the work may be turned, shaved and threaded by a threading die having therein this improved combined tool or chaser.

It is to be understood that, by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. A threading die for use in an automatic multiple spindle screw machine for cutting external threads comprising a body and a series of equidistantly disposed chasers, each comprising a circular disk having a single sector thereof removed to provide opposed axially extending edges, said disk having within the periphery thereof continuous threading grooves all around said disk and terminating at the opposed edges thereof and also having a plain band portion in front of said grooves and also terminating at said opposed edges, one of said edges having at its forward end in front of said threading surface a turning or cutting surface for making a roughing cut.

2. A threading die for cutting external threads comprising a body and a series of equidistantly disposed chasers, each comprising a circular disk having a single sector thereof removed to provide opposed axially extending edges, said disk having within the periphery thereof continuous threading grooves all around said disk and terminating at the opposed edges thereof, one of said edges having at its forward end in front of said threading surface a cutting surface, said edge also having between said cutting surface and the peripheral threading surface a shaving edge.

3. A threading die for use in an automatic multiple spindle screw machine for cutting external threads comprising a body and a series of equidistantly disposed chasers, each comprising a circular disk having a single sector thereof removed to provide opposed axially extending edges, said disk having within the periphery thereof continuous threading grooves all around said disk and terminating at the opposed edges thereof and also having a plain band portion in front of said grooves and also terminating at said opposed edges, one of said edges having between said peripheral threading surface and its front end a shaving surface for making a finishing cut.

4. A threading die for cutting external threads comprising a body and a series of equidistantly disposed chasers, each comprising a circular disk having a single sector thereof removed to provide opposed axially extending edges, said disk having within the periphery thereof continuous threading grooves all around said disk and terminating at the opposed edges thereof, said disk also having an axial opening and therearound a chamber having a diameter greater than said opening thereby forming a forwardly extending flange extending beyond the threading grooves, one of said edges having at its forward end in front of said threading surface a turning or cutting surface for making a roughing cut.

5. A threading die for cutting external threads comprising a body and a series of equidistantly disposed chasers, each comprising a circular disk having a single sector thereof removed to provide opposed axially extending edges, said disk having within the periphery thereof continuous threading grooves all around said disk and terminating at the opposed edges thereof, said disk also having an axial opening and therearound a chamber having a diameter greater than said opening thereby forming a forwardly extending flange, one of said edges having at its forward end in front of said threading surface a cutting surface and said edge also having between said cutting surface and peripheral threading surface a shaving edge.

6. A chaser for a die for use in an automatic multiple spindle screw machine and adapted to cut external threads and comprising a circular disk having a single sector thereof removed to provide opposed axially extending edges, said disk having within the periphery thereof continuous grooves all around said disk and terminating at the opposed edges thereof and also having a plain band portion in front of said grooves and likewise terminating at said opposed edges, one of said edges having at its forward end in front of said threading surface a turning or cutting surface for making a roughing cut.

7. A chaser for a die adapted to cut external threads and comprising a circular disk having a single sector thereof removed to provide opposed axially extending edges, said disk having within the periphery thereof continuous grooves all around said disk and terminating at the opposed edges thereof, one of said edges having at its forward end in front of said threading surface a cutting surface, said edge also having between said cutting surface and peripheral threading surface a shaving edge.

8. A chaser for a die for use in an automatic multiple spindle screw machine and adapted to cut external threads and comprising a circular disk having a single sector thereof removed to provide opposed axially extending edges, said disk having within the periphery thereof continuous threading grooves all around said disk and terminating at the opposed edges thereof and also having a plain band portion in front of said grooves and likewise terminating at said opposed edges, one of said edges having between said peripheral threading surface and its front end a shaving surface for making a finishing cut.

9. A chaser for a die adapted to cut external threads comprising a circular disk having a single sector thereof removed to provide opposed axially extending edges, said disk having within the periphery thereof continuous threading grooves all around said disk and terminating at the opposed edges thereof and also having an axial opening and therearound a chamber having a diameter greater than said opening thereby forming a forwardly extending flange extending beyond the threading grooves, one of said edges having at its forward end in front of said threading surface a turning or cutting surface for making a roughing cut.

10. A chaser for a die adapted to cut external threads comprising a circular disk having a single sector thereof removed to provide opposed axially extending edges, said disk having within the periphery thereof continuous threading grooves all around said disk and terminating at the opposed edges thereof and also having an axial opening and therearound a chamber having a diameter greater than said opening, one of said edges having at its forward end in front of said threading surface a cutting surface and said edge also having between said cutting surface and the peripheral threading surface a shaving surface.

11. A chaser for a die adapted to cut external threads comprising a circular disk having a single sector thereof removed to provide opposed axially extending edges, said disk having within the periphery thereof continuous threading grooves all around said disk and terminating at the opposed edges thereof and also having an axial opening and therearound a chamber having a diameter greater than said opening thereby forming a forwardly extending flange extending beyond the threading grooves, one of said edges having between said peripheral threading surface and its front end a shaving surface for making a finishing cut.

12. A threading die for cutting external threads comprising a body and a series of chaser blocks having angular front faces, a series of equidistantly disposed chasers carried by said blocks and angularly disposed to the axis of the die, each comprising a circular disk adapted to cut external threads and having a single sector thereof removed to provide opposed axially extending edges, said disk having within the periphery thereof continuous straight threading grooves all around said disk and terminating at the opposed edges thereof, one of said edges having at its forward end in front of said threading surface a cutting surface, said edge also having between said cutting surface and peripheral threading surface a shaving edge.

13. An automatically operative tool for use in an automatic multiple or single spindle screw machine to operate on the exterior of a stock bar and comprising a body, a series of chaser blocks circularly arranged and carried by said body, a series of circularly located chasers, each axially supported on the chaser block for radial opening and closing movement and adjustment, and means for automatically opening and closing said chasers, each of said chasers comprising a circular disk having a sector removed to provide spaced opposed edges depthwise of the disk and having a threading surface and in front thereof a cutting part effective to turn the work to form a shoulder thereon.

14. An automatically operative tool for use in an automatic multiple or single spindle screw machine to operate on the exterior of a stock bar and comprising a body, a series of blocks circularly arranged and carried by said body, and a series of circularly located cutters, each axially supported on a block for radial opening and closing movement and adjustment and each comprising a circular disk having a sector removed to provide spaced opposed edges depthwise of the disk, one of said opposed edges at the front part of the disk having a plurality of differently formed or positioned cutting portions effective to differently form the work around the exterior of the stock bar, said disk also having in the rear of said cutting portion, threading means for threading the work.

15. An automatically operative tool for use in an automatic multiple or single spindle screw machine to operate on the exterior of a stock bar and comprising a body, a series of blocks circularly arranged and carried by said body, and a series of circularly located cutters, each axially supported on a block for radial opening and closing movement and adjustment and each comprising a circular disk having a sector removed to provide spaced opposed edges depthwise of the disk, one of said opposed edges at the front part of the disk having a plurality of differently formed or positioned cutting portions effective to cut or turn a plurality of shoulders on the exterior of the stock bar, said disk also having in the rear of said cutting portion, threading means for threading the work.

16. An automatically operative tool for use in an automatic multiple or single spindle screw machine to operate on the exterior of a stock bar and comprising a body, a series of blocks circularly arranged and carried by said body, and a series of circularly located cutters, each axially supported on a block for radial opening and closing movement and adjustment and each comprising a circular disk having a sector removed to provide spaced opposed edges depthwise of the disk, one of said opposed edges at the front part of the disk having a cutting portion effective to cut or turn a shoulder on the exterior surface of the stock bar, said disk also having in the rear of said cutting portion, threading means for threading the work.

17. An automatically operative tool for use in an automatic multiple or single spindle screw machine to operate on the exterior of a stock bar and comprising a body, a series of blocks circularly arranged and carried by said body, and a series of circularly located cutters, each axially supported on a block for radial opening and closing movement and adjustment and each comprising a circular disk having a sector removed to provide spaced opposed edges depthwise of the disk, one of said opposed edges at the front part of the disk having a cutting portion effective to hollow mill the stock bar, said disk also having in the rear of said cutting portion, threading means for threading the work.

18. An automatically operative tool for use in an automatic multiple or single spindle screw machine to operate on the exterior of a stock bar and comprising a body and a series of equi-distantly disposed cutters, each comprising a circular disk having a single sector thereof removed to provide opposed axially extending edges, said disk having a plain band portion at the front thereof likewise terminating at said opposed edges, one of said edges having at its forward end one or more cutting portions effective to hollow mill or form one or more shoulders on a stock bar and also having in the rear of said cutting portion threading means for threading the work.

19. An automatically operative tool for use in an automatic multiple or single spindle screw machine to operate on the exterior of a stock bar and comprising a body and a series of equi-distantly disposed cutters, each comprising a circular disk having a single sector thereof removed to provide opposed axially extending edges, said disk having an axial opening and therearound a chamber having a diameter greater than said opening thereby forming a forwardly extending flange, one of said edges having at its forward end one or more cutting portions effective to hollow mill or form one or more shoulders on a stock bar, said disk also having in the rear of said cutting portion threading means for threading the work.

20. A cutting tool for a die head for use in an automatic multiple or single spindle screw machine to hollow mill or cut one or more shoulders on a stock bar and comprising a circular disk having a single sector thereof removed to provide opposed axially extending edges, said disk having a plain band portion at the front thereof and likewise terminating at said opposed edges, one of said edges having at its forward end a cutting portion effective to hollow mill or cut one or more shoulders on a stock bar and also having in the rear of said cutting portion threading means for threading the work.

21. A cutting tool for a die head for use in an automatic multiple or single spindle screw machine to hollow mill or cut one or more shoulders on a stock bar and comprising a circular disk having a single sector thereof removed to provide opposed axially extending edges, said disk having an axial opening and therearound a chamber having a forwardly extending flange one of said edges having at its forward end a cutting portion effective to hollow mill or cut one or more shoulders on a stock bar, said disk also having in the rear of said cutting portion threading means for threading the work.

22. A circular cutter adapted for use in the die of an automatic single or multiple spindle screw machine and comprising a disk having a sector thereof removed to form opposed spaced depthwise extending edges, said cutter having one or more circumferentially located stepped portions each terminating at one of said edges in a cutting portion for cutting a stock bar with different diametered portions, said disk having in the rear of said stepped portions a threading portion for also threading the bar.

23. A circular cutter adapted for use in the die of an automatic single or multiple spindle screw machine and comprising a disk having a sector thereof removed to form opposed spaced depthwise extending edges, one of said edges having one or more stepped formed cutting portions for cutting a stock bar with different diametered portions, said disk having in the rear of said stepped portions a threading portion for also threading the bar.

24. A die for use with automatic single or multiple spindle screw machines and comprising a body, a series of radially shiftable circular cutters, means for shifting them, each cutter comprising a circular disk having a sector thereof removed to form opposed spaced edges and having one or more circumferentially located stepped portions, each terminating at one of said edges in a cutting portion for cutting a stock bar with different diametered portions, said disk having threading means in the rear of said stepped portion for also threading said stock bar.

WILLIAM J. HOGG.